United States Patent
Lincoln

[15] 3,663,918
[45] May 16, 1972

[54] WINDSHIELD WIPER AND WASHER CONTROL SYSTEM

[72] Inventor: Clark Lincoln, Detroit, Mich.
[73] Assignee: General Motors Corporation, Detroit, Mich.
[22] Filed: May 12, 1971
[21] Appl. No.: 142,604

[52] U.S. Cl. ...........................338/200, 200/5 C, 200/172 A
[51] Int. Cl. .........................................................H01c 1/16
[58] Field of Search .......................338/200, 198, 128–134; 200/5, 5 C, 17, 18, 172 A; 15/250.02, 150.12, 250.13; 318/443, 444

[56] References Cited

UNITED STATES PATENTS

| | | | |
|---|---|---|---|
| 2,878,505 | 3/1959 | Ziegler | 15/250.02 |
| 2,942,221 | 6/1960 | Girolamo | 338/200 |
| 3,470,339 | 9/1969 | Roman | 200/172 A X |
| 3,487,492 | 1/1970 | Bischoff | 15/250.02 |
| 3,602,868 | 8/1971 | Lybrook | 338/198 |

Primary Examiner—Lewis H. Myers
Assistant Examiner—D. A. Tone
Attorney—W. E. Finken and W. A. Schuetz

[57] ABSTRACT

In a preferred form, this disclosure relates to a switch assembly having a housing which carries a first switch means or rheostat for controlling operation of an electric circuit means and a second switch for controlling the energization of other electric circuits. The first switch has a manually manipulatable first actuator supported thereon for movement in opposite directions and which is disposed in an opening of the housing. The second switch includes a manually manipulatable second actuator which is rotatably supported by the housing for movement in opposite directions between circuit open and circuit closed positions and which projects through the opening of the housing. The second actuator includes a cover portion which covers the first actuator when the second actuator is in the circuit open position and which progressively exposes the first actuator when it is moved from its circuit open position toward its circuit closed position to permit manual manipulation of the first actuator only when the second actuator has been moved to the circuit closed position.

3 Claims, 7 Drawing Figures

PATENTED MAY 16 1972

INVENTOR.
Clark Lincoln
BY
W.A. Schuetz
ATTORNEY

Fig. 3
Fig. 4
Fig. 5

INVENTOR.
Clark Lincoln
BY
W. A. Schuetz
ATTORNEY

PATENTED MAY 16 1972 3,663,918

INVENTOR.
Clark Lincoln
BY
W.A. Schnetz
ATTORNEY

WINDSHIELD WIPER AND WASHER CONTROL SYSTEM

The present invention relates to a switch assembly, and more particularly to a switch assembly for controlling the operation of a windshield washer and wiper unit and in which the wiper unit has a continuous operation mode and an intermittent operation mode with intervening dwell periods.

Windshield wiper units for automotive vehicles having both a continuous mode and an intermittent or pulse mode of operation have heretofore been provided. In the intermittent mode of operation the windshield wipers are moved through a single cycle of operation at periodic intervals and are at rest between these intervals. Some of the electrically operated wiper units have included a switch means for effecting either continuous or intermittent operation of the wiper unit and a rheostat for regulating the current to control operation of a timer for varying the length of time between successive cycles of operation of the wiper unit. An example of such an electrically controlled wiper unit is shown in U.S. Pat. No. 3,487,492.

The present invention relates to a novel switch assembly for controlling operation of such an electrically operated wiper unit. The switch assembly, in the preferred embodiment, includes a housing and a rheostat carried by the housing for regulating the current through a first electric circuit means to control operation of an electrical timer to vary the length of the intervening rest or dwell periods when the wiper unit is in the intermittent operation mode. The rheostat includes a manually manipulatable first actuator or wheel which is rotatably supported for movement in opposite directions and which is disposed in an opening in the housing. The switch assembly further includes a switch means which is carried by the housing for controlling the energization of other electric circuits to effect either continuous or intermittent operation of the wiper unit. The switch means includes a manually manipulatable second actuator which is rotatably supported by the housing for movement in opposite directions between a circuit open position, a continuous operation position, and an intermittent operation position. The second actuator also projects through the opening of the housing and includes a cover portion. The cover portion of the second actuator covers the first actuator when in its circuit open position and progressively exposes the first actuator as the second actuator is moved toward the intermittent operation position to permit manual manipulation of the first actuator only when the second actuator has been moved to the intermittent operation position.

An object of the present invention is to provide a new and improved switch assembly for selectively controlling the operation of an electrically operated windshield wiper unit to effect either continuous operation or intermittent operation with intervening dwell periods, and in which the switch assembly includes a housing having an opening therein, a first manually manipulatable actuator supported for movement in opposite directions for controlling the length of time of the dwell period during intermittent operation, and a second manually manipulatable actuator for controlling operation of the wiper unit and which is supported for movement in opposite directions from an off position to continuous and intermittent operation positions, and in which the second actuator has a cover portion for covering the first actuator when the second actuator is in its off position and which progressively exposes the first actuator as it is moved toward its intermittent operation position whereby the first actuator can be manually manipulated only when the second actuator is in its intermittent operation position.

Another object of the present invention is to provide a new and improved switch assembly as defined in the preceding object and in which the first actuator is a rotatable wheel and the second actuator straddles the first actuator so as to provide a compact switch assembly in which the actuators are located back to back.

These and other objects of the invention will become more fully apparent from the following description and drawing wherein:

FIG. 3 is a sectional view taken approximately along line 3—3 of FIG. 1;

FIG. 4 is a view similar to that shown in FIG. 3, but showing different parts in different positions;

FIG. 5 is a plan view of part of the switch assembly shown in FIG. 2;

Figure 1:
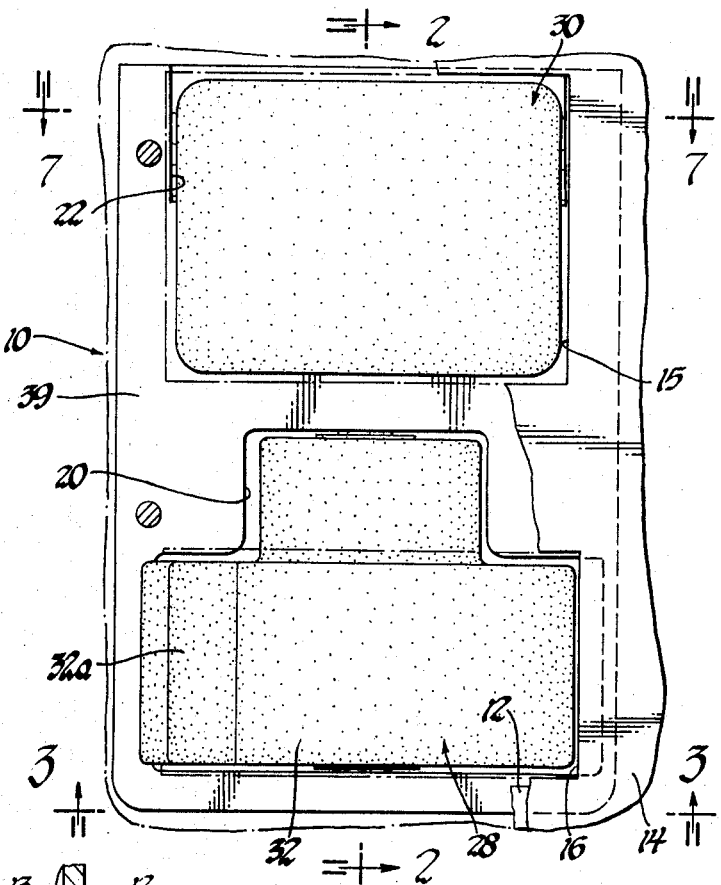
FIG. 1 is a front elevational view of the switch assembly of the present invention and showing the same attached to a panel.

As representing a preferred embodiment of the present invention, the drawings show a switch assembly 10. Although the switch assembly 10 could be used for controlling various electrically operated devices, it is particularly susceptible for use in controlling an electrically operated windshield washer and wiper unit for an automotive vehicle and in which the wiper unit has both a continuous and an intermittent mode of wiper operation. The windshield washer and wiper unit could be of any suitable or conventional construction and, since they do not per se form a part of the present invention, they will not be described in detail. Suffice it to say that the wiper unit has a continuous mode of operation and an intermittent mode of operation with intervening dwell periods and with the length of the dwell periods being controlled by an electric timer and adjustable rheostat. Such a wiper unit is shown and described in U.S. Pat. No. 3,487,492. The washer unit is preferably controlled by an electrical relay and is like that shown and described in U.S. Pat. No. 2,878,505.

The switch assembly 10 is adapted to be suitably connected to a panel or dashboard 12 of an automotive vehicle (not shown) and with portions of the switch assembly 10 extending through an opening 13 in the panel 12. A decorative escutcheon 14 overlies the opening 13 in the panel 12 and has portions of the switch assembly 10 extending through a pair of openings 15 and 16 to provide for manual manipulation thereof.

The switch assembly 10 broadly comprises a plastic housing 18 having openings 20 and 22 therethrough; first switch or control means 23 comprising a rheostat 24 for controlling the length of time of the intervening dwell periods and which includes a first manually manipulatable actuator or control wheel 26 supported by the rheostat 24 and extending through the opening 20; a second switch means 27 for controlling the operation of the wiper unit and including a second manually manipulatable actuator 28 supported by the housing 18 and extending through opening 20 for movement in opposite directions between circuit open, continuous operation, and intermittent operation positions; and a third switch means 29 including a push button actuator 30 which extends through opening 22 of the housing 18 and which effects a single cycle of operation of the wiper unit when partially depressed and conjoint operation of the wiper and washer units when fully depressed. The second actuator 28 straddles the control wheel 26 and has a cover portion 32 for covering the control wheel 26 when the second actuator 28 is in its circuit open position. The cover portion 32 progressively exposes the control wheel 26 as the second actuator 28 is moved from its circuit open position toward its intermittent operation position whereby the control wheel 26 for controlling the rheostat 24 can be manually manipulated only when the second actuator 28 has been moved to its intermittent operation position.

Figure 2:
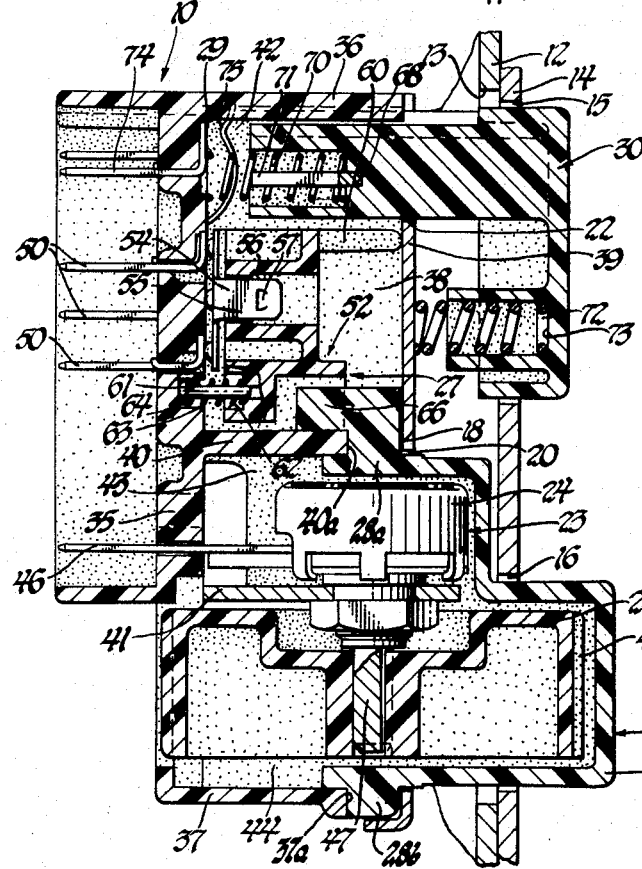
FIG. 2 is a sectional view taken approximately along lines 2—2 of FIG. 1.

Referring to drawings 1 and 2, the escutcheon 14 is suitably attached to the dashboard or panel 12 of the automotive vehicle (not shown) and has an opening 15 through which the push button actuator 30 extends and an opening 16 through which first actuator 26 and second actuator 28 extend. Suitably secured to the escutcheon 14 is the housing 18. The housing 18 is generally rectangular in shape and includes a bottom wall 35, end walls 36 and 37, side walls 38 (only one of which is shown in FIG. 2), top wall 39, and intermediate walls 40 and 41. The end walls 36 and 37, top wall 39 and the intermediate walls 40 and 41 divide the housing into three chambers 42–44. The top wall 39 is in the form of a cover suitably connected to the end walls 36 and 37 of the housing 18.

The first control means 23 includes a rheostat 24 which is suitably supported by the intermediate wall 40 and disposed within the chamber 43 of the housing 18. The rheostat 24 is adapted to be electrically connected via spaced stationary terminals 46 which extend through the bottom wall 35 of the housing 18 in a first electric circuit means (not shown). The rheostat 24 during intermittent operation of the wiper unit regulates the current through the first electric circuit means and functions to control the operation of an electric timer or bimetal to vary the length of the intervening dwell periods of the wiper unit, such as in the manner described in U.S. Pat. No. 3,487,492.

The first control means further includes control wheel 26 which is secured to a shaft 47 which is rotatably supported by the rheostat 24 for movement in opposite directions. The shaft 47 in turn is connected to a pointer or element (not shown) for varying the setting of the rheostat 24 to regulate the current therethrough. Referring to FIGS. 2 and 4, the control wheel 26 has a toothed outer periphery 48 and extends through the opening 20 of the housing 18, the opening 13 of the panel 12, and the opening 16 of the escutcheon 14 to provide for manual manipulation thereof.

The switch assembly 10 also includes the second switch means 27 which controls the operation of the wiper unit by controlling the energization of electric circuits (not shown) to effect either a continuous operation mode or an intermittent operation mode with intervening dwell periods. The second switch means 27 includes a plurality of spaced stationary terminals 50 which are carried by the bottom wall 35 of the housing 18 and which have contact portions disposed within the chamber 42. The respective stationary contacts 50 are adapted to be electrically connected in circuits for controlling energization of the wiper unit. The second switch means 27 also includes a plastic contact carrier 52 which is slidably supported by the bottom wall 35 within the chamber 42 of the housing 18 for linear movement in opposite directions (into and out of the plane of the drawing, as viewed in FIG. 2). The contact carrier 52 carries a pair of spaced bridging contacts 54, as shown in FIGS. 2 and 5, which are slidably supported thereon for limited movement toward and from the bottom wall 35 of the housing 18. To this end, each of the bridging contacts 54 has a pair of rearwardly extending flanges 55 which are received within stepped grooves 56 in the contact carrier 52. The flanges 55 adjacent their rearward ends have laterally extending tangs 57 which are adapted to engage the steps of the grooves 56 to retain the bridging contacts 54 on the contact carrier 52. The contacts are spring biased into engagement with the bottom wall 35 of the housing 18 by compression springs 58 which have one end in abutting engagement with the contacts 54 and their other ends in abutting engagement with the bottom of openings 59 in the contact carrier 52. Movement of the contact carrier 52 by the springs 58 away from the bottom wall 35 of the housing 18 is limited by upstanding pinshaped portions 60 formed integral with the contact carrier 52 and which are adapted to engage the top wall 39 of the housing 18. The contacts 54 are adapted to selectively bridge different ones of the stationary terminals 50 to effect either continuous or intermittent operation of the wiper unit in response to linear movement of the contact carrier 52.

Figure 6:
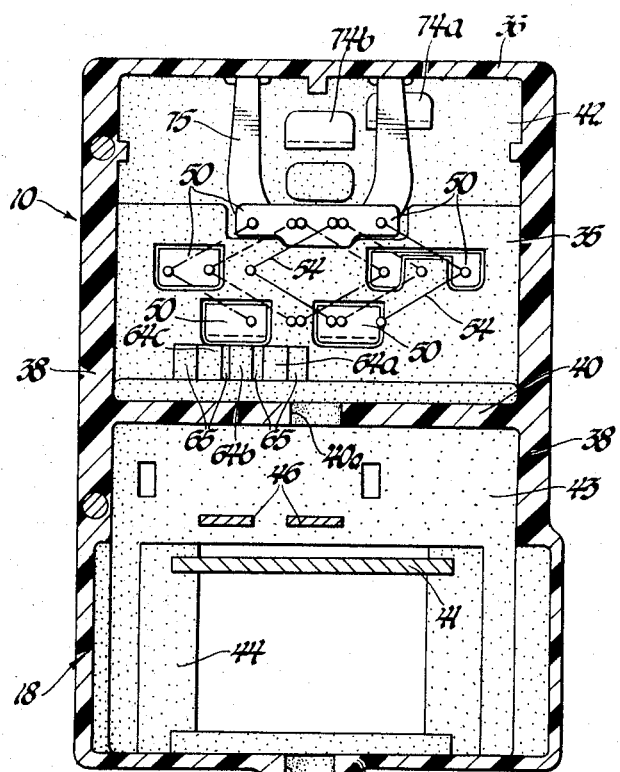
FIG. 6 is a plan view of the switch assembly with some parts removed.
Figure 7:
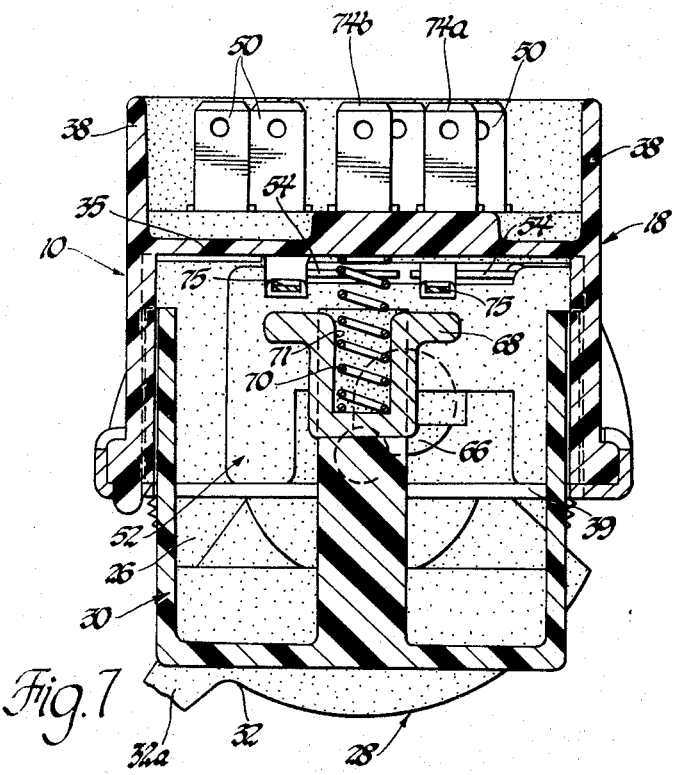
FIG. 7 is a sectional view taken approximately along lines 7—7 of FIG. 1.

The contact carrier 52 is adapted to be linearly moved between a first position, as schematically shown by the solid lines in FIG. 6, in which it effects de-energization of the wiper unit, a second position, as shown by the dotted lines in FIG. 6, in which its contacts 54 bridge selective ones of the stationary terminals 50 to effect continuous operation of the wiper unit, and a third position, as shown by the phantom lines in FIG. 6, in which its contacts 54 bridge other selective ones of the stationary terminals 50 to effect intermittent operation of the wiper unit.

The contact carrier 52 is detented when moved into any of the aforementioned positions by a detent pin 61 which is located within a hole 62 in the contact carrier 52. A spring 63 has one end in abutting engagement with the bottom of the hole 62 and its other end in abutting engagement with the end of the detent pin 61. The detent pin 61 is biased by the spring 63 into engagement with the bottom of one of three grooves or depressions 64a, 64b and 64c in the bottom wall 35 of the housing 18. The detent pin 61 is received in depression 64a when the contact carrier 52 is in its first position, depression 64b when the contact carrier 52 is in its second position, and depression 64c when the contact carrier 52 is in its third position. The depressions are separated by inclined wall portions 65. The walls 65 of the depressions 64a–c and detent pin 61 serve to prevent movement of the contact carrier 52 unless the contact carrier 52 is moved to another position by the manually manipulatable second actuator 28. During this movement the pin 61 is cammed upwardly into the hole 62 until it clears the adjacent wall 65 whereupon the spring 63 moves the pin downwardly into the adjacent depression.

The manually manipulatable second actuator 28 is pivotally supported by the intermediate wall 40 of the housing 18 and the end wall 37 of the housing 18 for movement in opposite directions between a circuit open position which positions contact carrier 52 in its first position to effect de-energization of the wiper unit, a continuous operation position which places the contact carrier 52 in its second position to energize the wiper unit for continuous operation, and an intermittent operation position which places the contact carrier 52 in its third position in which it effects intermittent operation of the wiper unit. The second actuator 28 is supported upon a common axis of rotation with that of control wheel 26 and straddles the rheostat 24 and its control wheel 26. The second actuator 28 is pivotally supported upon a pair of cylindrical projections 28a and 28b which extend in opposite directions from two sides of the actuator 28 and which are received within a semi-circular opening 40a in the intermediate wall 40 and another semi-circular opening 37a in the end all 37, respectively. The projection 28a extends through opening 40a into the chamber 42 and has a cam 66 integral therewith. The cam and adjacent side wall of the actuator 28 straddle the intermediate wall 40 adjacent the opening 40a to prevent axial movement of the actuator 28. The cam 66 is received within a slot 67 in contactor member 52 and serves to move the contactor member 52 by engaging the walls of slot 67 in response to pivotal movement of the second actuator 28 between its three positions.

The second actuator 28 includes an arcuately shaped cover portion 32 which is concentric with and surrounds the rheostat 24 and its control wheel 26 and which extends through opening 20 of the housing 18, opening 13 of the panel 12, and opening 16 of the escutcheon 14 to provide for manual manipulation thereof. A projection or flange 32a which is integral with and extends outwardly from the left side of the cover portion 32, as shown in FIG. 1, is provided for the operator to manually pivot the second actuator 28. Now referring to FIGS. 3 and 4, the cover portion 32 of the second actuator 28 completely covers that portion of the control wheel 26 which extends through opening 16 of the escutcheon 14 when the second actuator 28 is in its circuit open position. As the second actuator 28 is pivoted from its circuit open position towards its intermittent operation position, that portion of the control wheel 26 projecting through the opening 16 of the escutcheon 14 is progressively exposed. When the second actuator 28 has been completely pivoted to its intermittent operation position, that portion of the control wheel 26 projecting through the opening 16 of the escutcheon 14 is sufficiently exposed to permit manual manipulation thereof.

Again referring to FIGS. 1 and 2, the third switch means 29 comprises a push button 30 which extends through the opening 22 of the housing 18, opening 13 of the panel 12, and the opening 15 of the escutcheon 14. The push button 30 which carries a metal boot 68 on its internal end is biased away from the back or bottom wall 35 of the housing 18 by a spring 70 which is received within a hole 71 in the boot 67 and which is in abutting engagement with the bottom wall 35 of the housing 18 and of the bottom of the hole 71. The push button 30 is further biased by a spring 72 which is received within another hole 73 in push button 30 and which is in abutting engagement with top wall 39 of the housing 18 and the bottom of the hole 73.

The third switch means 29 further includes stationary terminals 74a and 74b which are carried by the bottom wall 35 of the housing 18 and which have contact portions disposed within the chamber 42. The terminals 74a and 74b are adapted to be electrically connected with a relay of the washer unit and the wiper unit, respectively. The third switch means 29 further includes a bifurcated leaf spring means 75 which has its bight portion mounted to the bottom wall 35 of the housing 18 and secured with a ground terminal 50 and has its legs extending upwardly and toward the end wall 36 in cantilever fashion. The leaf spring 75 is normally self-biased toward a position in which its legs do not engage the contact portion of the terminals 74 on the boot 68. The third switch means 29 is adapted to provide a single cycle of operation of the wiper unit when the push button 30 is momentarily depressed halfway. Depression of the push button 30 halfway causes the boot 68 to engage the leaf spring means 75, and, because the spring 70 abuts the contact portion of the terminal 74b in the bottom wall 35, an electrically conductive path is completed from the terminal 74b through the springs 70 and 75 and the boot 68 to the ground terminal 50. This effects energization of the unit for a single cycle. The third switch means is also adapted to provide conjoint operation of the wiper and washer units when fully depressed. When the push button is fully depressed, the boot 68 engages the leaf spring 75 to energize the wiper unit and deflects the leaf spring 75 into engagement with the contact portion of the terminal 74a in the bottom wall 35 to energize the washer unit. When the leaf spring 75 engages the terminal 74a, an electrically conductive path is completed from the terminal 74a through the leaf spring 75 to the ground terminal 50 which effects energization of the washer unit. The washer unit is programmed to operate for a predetermined time and includes a cam operated holding switch which keeps the wiper unit energized after release of the push button 30. The wiper unit remains energized for a predetermined time period subsequent to the cessation of washer operation, as described in U.S. Pat. No. 2,878,505.

In normal operation, the wiper unit is placed in its continuous operation mode by manually pivoting the second actuator 28 from its circuit open position to its continuous operation position, as shown in FIG. 3. As the second actuator 28 is pivoted, the cam 66 engages the walls defining the slot 67 of the contact carrier 52 and moves the contact carrier 52 from its first position toward its second position where the contacts 54 bridge the contact portions of certain of terminals 50 to effect continuous energization of the wiper unit. The detent pin 61 upon movement of the contact carrier 52, is pushed against the bias of spring 63 further into hole 62 by virtue of its engagement with the wall 65 until it clears the wall. When the contact carrier 52 reaches its second position, the detent pin is received within depression 64b by virtue of the bias of spring 63 and thereby maintains the contact carrier 52 in its second position until the second actuator 28 is manually pivoted to another position. Similarly, the wiper unit is placed in its intermittent mode of operation when the second actuator 28 is manually pivoted to its intermittent operation position. As the second actuator 28 is pivoted, the cam 66 again effects linear movement of the contact carrier 52 to its third position in which contacts 54 bridge different ones of terminals 50. Detent pin 61 has then been shifted from depression 64b to depression 64c, in a manner similar to that previously described, to maintain the contact carrier 52 in its third position.

When the second actuator has been manually pivoted to its intermittent operation position, the control wheel 26 is sufficiently exposed to permit manual manipulation thereof which, through the rheostat 24, varies the length of the dwell periods between the successive cycles of operation of the wiper unit. The washer unit is activated when the push button 30 is manually depressed against the bias of springs 70 and 72 to engage and deflect the leaf spring 75 into a bridging relationship with the contact portions of the terminals 74a and 74b. It should be apparent that the wiper unit can be returned to its continuous operation mode or de-activated by manually pivoting the second actuator 28 to return it to its other positions.

The foregoing disclosure relates to only one embodiment of the invention which may be modified within the scope of the appended claims.

What is claimed is:

1. In a switch assembly, the combination comprising; a housing having an opening therein; first switch means carried by said housing for controlling operation of a first electric circuit means, said first switch means including a manually manipulatable first actuator supported by said first switch means for movement in opposite directions and which is disposed in said opening of said housing; second switch means carried by said housing for controlling energization of second electric circuit means, said second switch means including a manually manipulatable second actuator rotatably supported by said housing for movement in opposite directions between circuit open and circuit closed positions, said second actuator projecting through said opening and including a cover portion for covering said first actuator when in its circuit open position and for progressively exposing said first actuator when moved from its circuit open position toward its circuit closed position whereby manual manipulation of said first actuator is permitted only when said second actuator is moved toward its circuit closed position.

2. A windshield wiper switch assembly for selectively controlling the operation of an electric motor of a windshield wiper unit to effect either continuous operation or intermittent operation with intervening dwell periods comprising; a housing having an opening therein; rheostat means carried by said housing for regulating the current through first electric circuit means to set the length of the intervening dwell periods during intermittent operation of the wiper unit, said rheostat means including a manually manipulatable first actuator rotatably supported for movement in opposite directions and which is disposed in said opening of said housing; switch means carried by said housing for controlling the energization of electric circuit means to effect either continuous or intermittent operation with intervening dwell periods of said wiper unit; said switch means including a manually manipulatable second actuator rotatably supported by said housing for movement in opposite directions between a circuit open position and a continuous operation position and an intermittent operation position, said second actuator projecting through said opening and including a cover portion for covering said first actuator when in said circuit open position and which progressively exposes said first actuator when moved toward said intermittent operation position whereby manual manipulation of said first actuator is permitted only when said second actuator is moved to said intermittent operation position.

3. A windshield wiper switch assembly for selectively controlling the operation of an electric motor of a windshield wiper unit to effect either continuous operation or intermittent operation with intervening dwell periods comprising; a housing having an opening therein; a rheostat mounted within said housing for regulating the current through first electric circuit means to vary the length of the intervening dwell periods of the wiper unit during intermittent operation; a manually manipulatable wheel rotatably supported by said rheostat for rotation in opposite directions to provide for manual control of said rheostat, said wheel projecting through said opening; switch means for controlling the energization of electric circuit means to effect either continuous operation or intermittent operation with intervening dwell periods of said wiper unit, said switch means including a plurality of spaced stationary terminals carried by said housing, a linearly movable contactor having a pair of bridging contacts spring biased toward said terminals and selectively bridging said terminals in response to linear movement of said contactor, a manually manipulatable actuator straddling said wheel and pivotally supported by said housing for rotation in opposite directions between a circuit open position and a continuous operation position and an intermittent operation position; said second actuator having cam means for moving said contactor linearly to selectively bridge said terminals, said actuator projecting outside said opening and having an arcuately shaped cover enclosing said control wheel to prevent manual manipulation thereof when in said circuit open position, said cover progressively exposing said control wheel as said second actuator moves toward said intermittent operation position whereby manual manipulation of said wheel is permitted only when said actuator is moved to said intermittent operation position.

* * * * *